UNITED STATES PATENT OFFICE.

JOHN K. JONES, OF KANSAS CITY, MISSOURI, ASSIGNOR TO THE AMERICAN SILICAN COMPANY, OF OMAHA, NEBRASKA.

WALL-PLASTER.

SPECIFICATION forming part of Letters Patent No. 511,735, dated December 26, 1893.

Application filed August 28, 1891. Serial No. 403,959. (No specimens.)

*To all whom it may concern:*

Be it known that I, JOHN K. JONES, of Kansas City, in the county of Jackson and State of Missouri, have invented certain new and useful Improvements in Retarders for Plastic Compounds, of which the following is a full, clear, and exact description.

My invention relates to a certain new and useful composition known to the trade as a "retarder," the same forming a merchantable commodity which remains in its normal condition until mixed with other ingredients forming a plastic compound to be used for plastering; and my invention consists in certain features of novelty hereinafter described and pointed out in the claim.

My retarder is composed of three elements; namely, sugar, flour and air-slaked lime, in the following proportions: To two hundred and fifty pounds of air-slaked lime, I add twenty-five pounds of flour and one hundred pounds of sugar, which are thoroughly mixed and intermingled with each other. This forms my improved retarder, which may be retained in its normal condition for any length of time until it is desirable to mix the same with the plaster of paris and sand in order to make the plaster, the retarder holding the plaster of paris in its plastic state a sufficient length of time to give the workmen time to use the same, the plaster being put upon the walls or other surfaces in the ordinary manner if desired, by placing said plaster on the walls by means of trowels or other tools, giving the workmen ample time to use the plaster without the same becoming set, the lime in the retarder retarding the setting of the plaster of paris, the flour preventing the discoloration and rendering the plaster capable of being easily worked during the placing of the same, and the sugar finally hardening the plaster.

In order to form a perfect retarder the sugar, and flour must be mixed with the air slaked lime in a dry or powdered state to be used with plaster of paris and sand when it is desired to use the plaster. Thus a perfect chemical combination is formed giving the very best results.

I claim as my invention—

A composition of matter for wall-plaster consisting of powdered sugar one hundred parts, flour twenty-five parts, powdered air slaked lime two hundred and fifty parts, plaster of paris, sand, and water.

JOHN K. JONES.

Witnesses:
L. F. RIEGER,
P. MURPHY.